(12) United States Patent
Antraygue

(10) Patent No.: US 8,511,621 B2
(45) Date of Patent: Aug. 20, 2013

(54) DEVICE FOR PILOTING A CRAFT HAVING AN ELECTROMAGNETIC ACTUATOR

(75) Inventor: Cedric Antraygue, Villefranche de Rouergue (FR)

(73) Assignee: Ratier Figeac, Figeac (FR)

( * ) Notice: Subject to any disclaimer, the term of this patent is extended or adjusted under 35 U.S.C. 154(b) by 315 days.

(21) Appl. No.: 12/979,692

(22) Filed: Dec. 28, 2010

(65) Prior Publication Data

US 2011/0155861 A1  Jun. 30, 2011

(30) Foreign Application Priority Data

Dec. 30, 2009  (FR) ...................................... 09 06409

(51) Int. Cl.
*B64C 13/50* (2006.01)

(52) U.S. Cl.
USPC ........... 244/236; 244/220; 244/221; 244/227; 244/228; 244/234; 310/12.04; 310/156.01

(58) Field of Classification Search
USPC ................. 244/220, 221, 227, 228, 234, 236; 310/12.04, 156.01
See application file for complete search history.

(56) References Cited

U.S. PATENT DOCUMENTS

| | | | |
|---|---|---|---|
| 4,187,441 A | 2/1980 | Oney | |
| 4,260,035 A * | 4/1981 | Loveless et al. | 180/6.5 |
| 4,358,693 A | 11/1982 | Palmer et al. | |
| 4,401,986 A * | 8/1983 | Trenkler et al. | 340/870.32 |
| 4,507,639 A * | 3/1985 | Trenkler et al. | 336/115 |
| 4,584,577 A * | 4/1986 | Temple | 340/870.32 |
| 4,639,667 A * | 1/1987 | Andresen | 324/207.18 |
| 4,651,130 A * | 3/1987 | Pennell | 341/116 |
| 4,719,381 A * | 1/1988 | Miles | 310/166 |
| 4,733,214 A * | 3/1988 | Andresen | 338/128 |
| 4,908,558 A * | 3/1990 | Lordo et al. | 318/648 |
| 5,929,846 A * | 7/1999 | Rosenberg et al. | 345/161 |
| 6,320,284 B1 * | 11/2001 | Fontana et al. | 310/12.31 |
| 6,664,666 B2 * | 12/2003 | Corcoran | 310/12.23 |
| 7,061,466 B1 * | 6/2006 | Moore et al. | 345/156 |
| 7,394,173 B2 * | 7/2008 | Cope et al. | 310/15 |

(Continued)

FOREIGN PATENT DOCUMENTS

| | | |
|---|---|---|
| DE | 19501439 A1 | 9/1996 |
| DE | 202005015434 U1 | 2/2007 |
| GB | 2350170 A | 11/2000 |

(Continued)

OTHER PUBLICATIONS

French Search Report, dated Jun. 30, 2010, from corresponding French application.

*Primary Examiner* — Isam Alsomiri
*Assistant Examiner* — Assres H Woldemaryam
(74) *Attorney, Agent, or Firm* — Young & Thompson

(57) ABSTRACT

A device for piloting includes a piloting member connected to at least one member for driving the craft, an electromechanical support box including, for each pivot connection, at least one actuating motor of the piloting member constituted of an electromagnetic actuator including a movable armature integrally formed with the piloting member and equipped with at least one permanent magnet having a magnetic moment parallel to the axis of the pivot connection, and an electromagnetic circuit including a fixed armature, arranged to allow the movable armature to move in the air gap zone, the magnetic moment of the movable armature sweeping each radial surface portion, and at least one coil winding which is dependent in position on the fixed armature and is capable of generating electromagnetic torque on the movable armature.

17 Claims, 7 Drawing Sheets

(56) References Cited

U.S. PATENT DOCUMENTS

| | | | |
|---|---|---|---|
| 8,264,458 B2* | 9/2012 | Cooper et al. | 345/161 |
| 2002/0053849 A1* | 5/2002 | Corcoran | 310/156.01 |
| 2008/0054745 A1* | 3/2008 | Sentmanat | 310/89 |
| 2008/0272243 A1 | 11/2008 | Decker | |

FOREIGN PATENT DOCUMENTS

| | | |
|---|---|---|
| GB | 2412421 A | 9/2005 |
| WO | 03025394 A2 | 3/2003 |

* cited by examiner

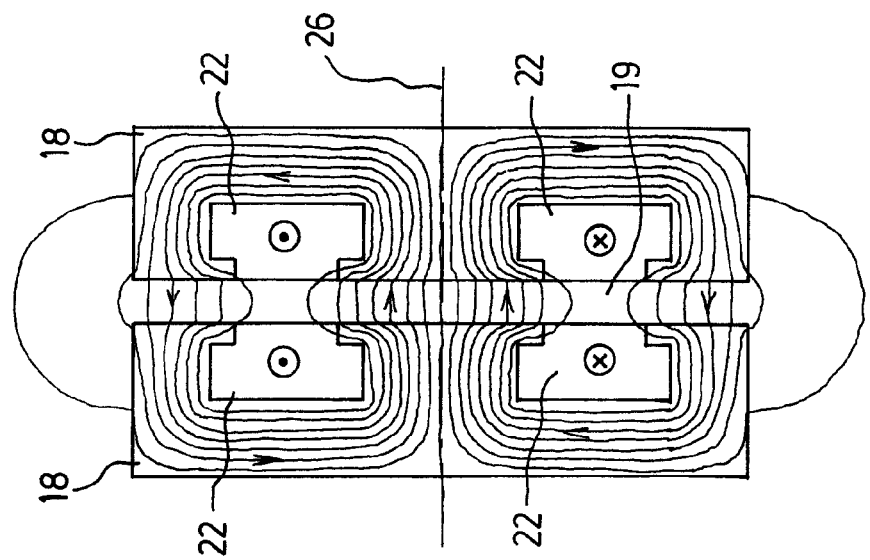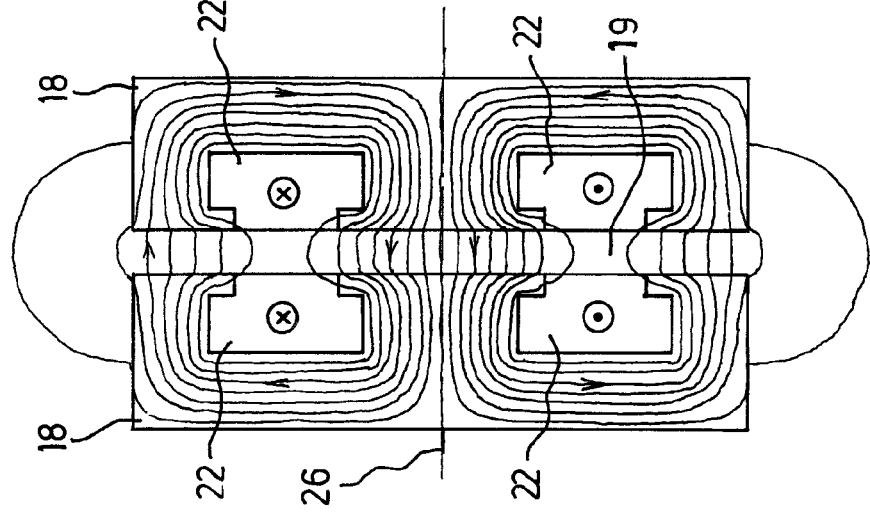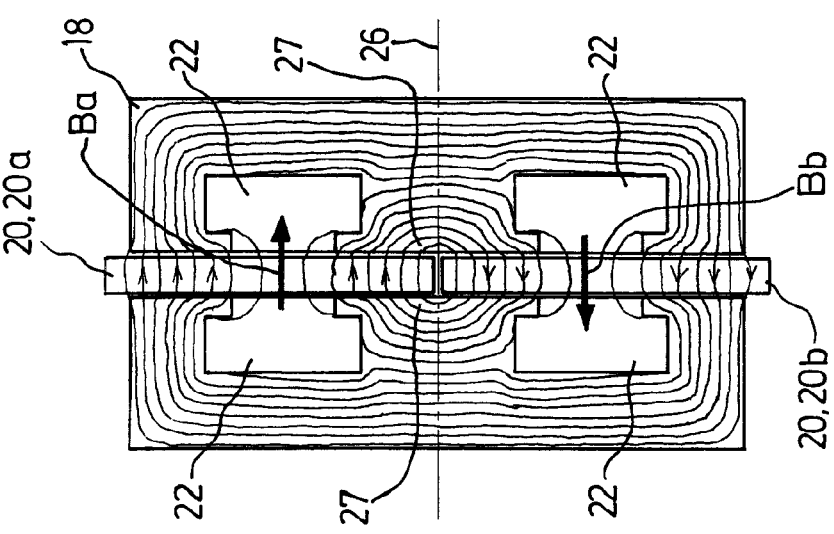

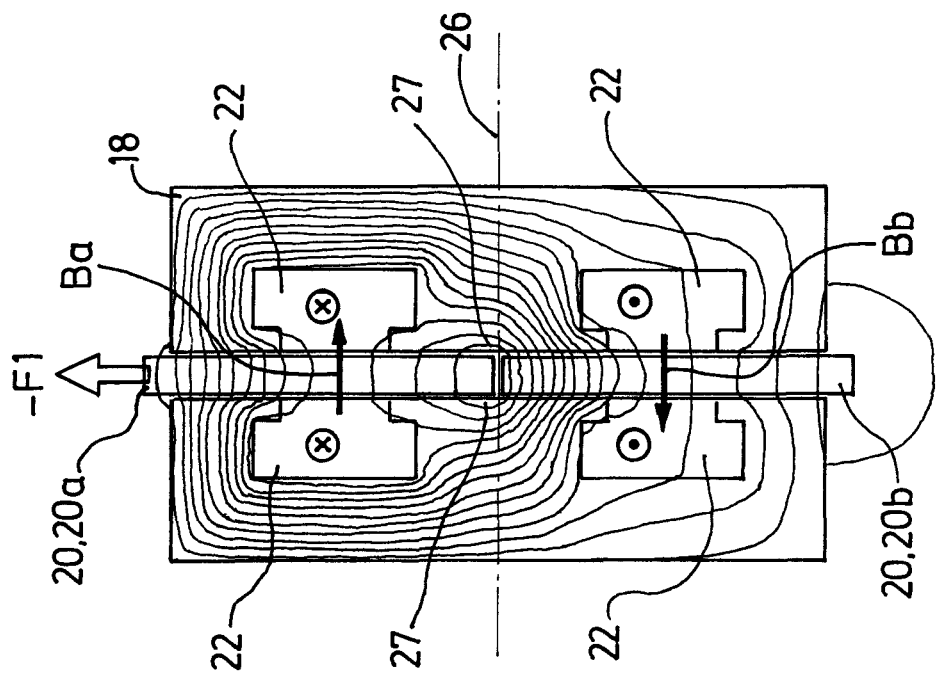
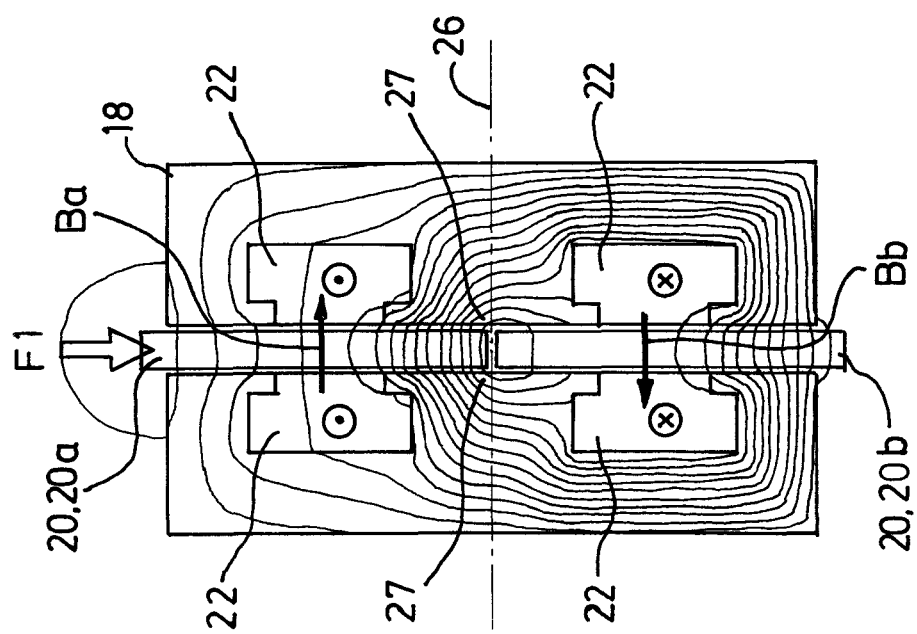

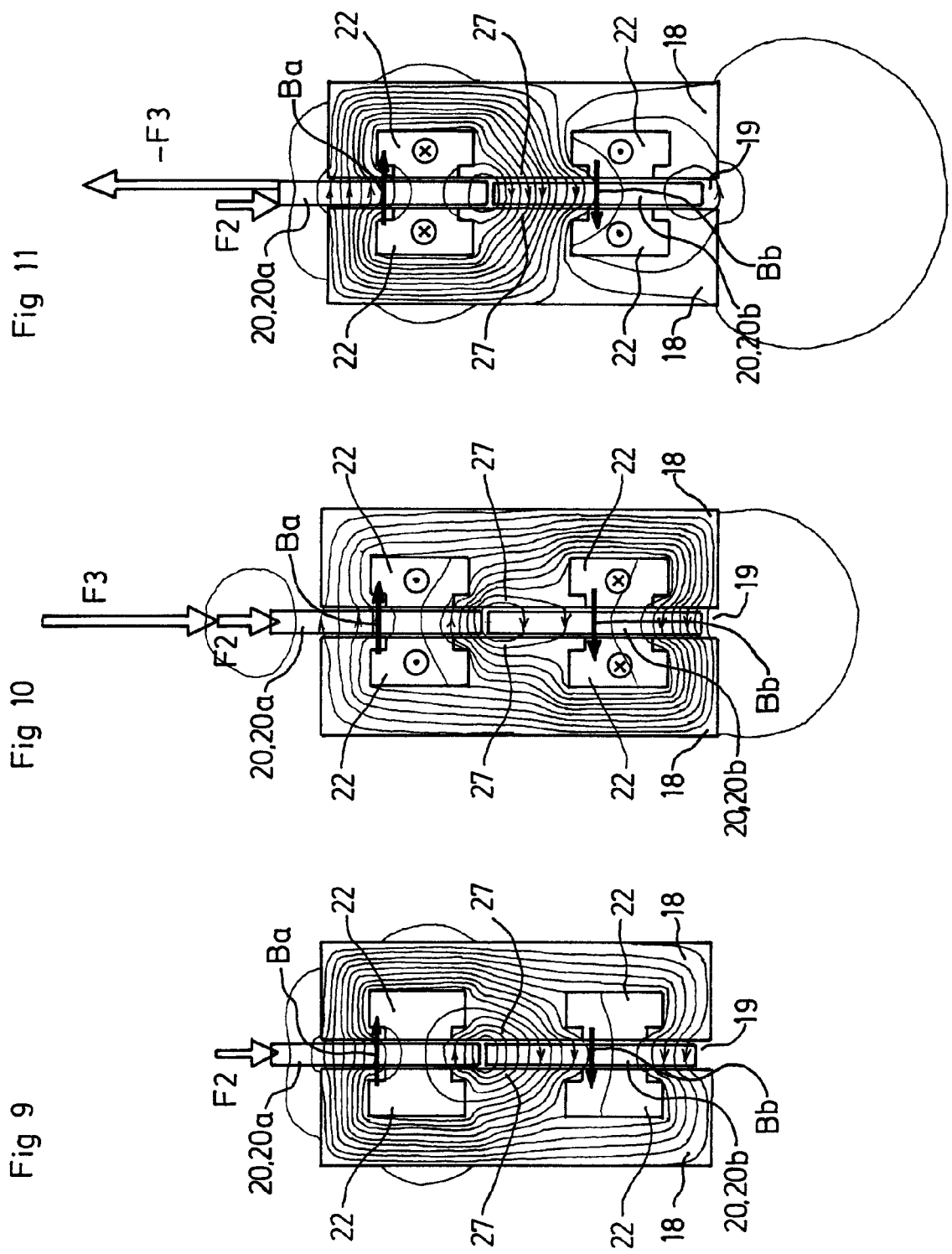

DEVICE FOR PILOTING A CRAFT HAVING AN ELECTROMAGNETIC ACTUATOR

BACKGROUND OF THE INVENTION

1. Field of the Invention

The invention relates to a device for piloting a craft—in particular a craft comprising at least one aerodynamic or hydrodynamic rudder, such as an aircraft or a ship.

2. Description of the Related Art

Throughout the text, and unless indicated otherwise, the term "piloting" and its derivative terms designate driving a craft by a human pilot who manoeuvres at least one piloting member such as a joystick, operating lever, control column, pedal, etc.

Traditionally, a device for piloting a craft comprises at least one piloting member connected to at least one driving member—in particular a rudder—of the craft, for controlling the position and/or movement thereof. A piloting member of this kind may be mounted and guided in rotation by means of at least one pivot connection about an axis in relation to an electromechanical support box. In the case for example of a sidestick for piloting an aircraft, the piloting member is mounted and guided in rotation by means of two pivot connections which are at a right angle and secant (forming a central point joint).

When the device for piloting is of the type called motorised, for each pivot connection of the piloting member the electromechanical support box comprises at least one actuating motor (in general a plurality of actuating motors to ensure redundancy in the case of an aircraft). An actuating motor of this kind in particular allows commands from a computer system for automatic pilot to be transmitted to the piloting member and/or a specific dynamic behaviour of the piloting member to be simulated in order to bring about a return to neutral and/or appropriate sensations (in particular sensations of muscular effort, simulations of friction or force feedback, assistance with movements, the combination of two piloting members on a single craft (pilot and copilot, etc.) which allow or facilitate piloting by a human pilot).

In the most common piloting devices, such as sidesticks for piloting aircraft, the actuating motors consist in electric motors, in particular torque motors or brushless three-phase rotary motors, which are coupled to the piloting member through the axis of the corresponding pivot connection, in most cases by way of a step-down geared transmission. Automatically switching sensors must be provided for controlling each phase of each motor in dependence on the position of the piloting member. Moreover, at least one return spring is coupled to the piloting member to return it to the neutral position in relation to the box. It is also possible for a damping element to be provided.

All these members, which must moreover be provided in multiple form for the sake of redundancy, are complex and subject to breakdown (taking into account in particular the large number of moving parts in contact with one another, which undergo friction and/or work fatigue), to gaps, and considerably increase the cost, weight and bulk of the piloting device.

Thus, WO 03/025394 describes a device for motorisation of a joystick, comprising a stator which includes an interior surface forming a spherical inner face, stator coils arranged at right angles, and a rotor which is movable along the interior surface of the stator and carries a plurality of magnets having a radial magnetic moment. A spherical architecture of this kind is particularly bulky and heavy, and is relatively ineffective from an electromagnetic point of view. Moreover, it is complex in its implementation.

DE 19501439 also describes a device for motorisation of a stick of the spherical type having electromagnetic architecture, in which the air gap forms a spherical inner face and the magnetic moment of the permanent magnets acting to pivot the stick about an axis of a pivot connection extends radially and not parallel to this axis. This device has the same disadvantages.

GB 2350170 describes a joystick device with force feedback comprising, for each pivot connection, an electromagnetic actuator comprising peripheral magnets having a radial magnetic moment in relation to the axis of the pivot connection, and a fixed armature forming an air gap in the shape of a portion of a cylinder about the axis of the pivot connection. This double-cylinder architecture does not allow a return torque to be obtained over a range of angular amplitude which is both large and controlled. Moreover, in this case too, this architecture results in considerable horizontal bulk.

GB 2412421 describes a method allowing a sensation of feedback force to be generated in a hydraulic actuation lever. In the first variant, a permanent magnet is associated with the handle and cooperates with one or the other of the electromagnetic coils to generate a magnetic force which is in opposition to the movement of the lever as a function of the variation in pressure of the fluid in the hydraulic circuit which is caused by the user moving the lever. The magnetic moment of the magnet is at a right angle to the axis of the pivot connection. Depending on the direction in which the current is applied to the coils, the magnet is attracted or repelled in one direction or the other. In the second variant, the electromagnetic architecture is of the spherical type. This document does not therefore enable the provision of a device in which an electromagnetic return is obtained in the absence of electrical supply or which moreover allows the above-mentioned problems to be solved.

BRIEF SUMMARY OF THE INVENTION

An object of the invention is therefore to obviate these disadvantages by proposing a motorised device for piloting which is greatly simplified, lighter in weight, less bulky and less expensive, while being reliable, precise and completely ergonomic and which moreover provides the return of the piloting member into a stable neutral position in a simple and reliable manner.

An object of the invention is more particularly to propose a device for piloting of this kind in which the number of parts is considerably reduced, in particular with no brushless motor, step-down gear, spring or damping element, and in which the number of sensors is reduced. In particular, an object of the invention is to reduce the number of parts in contact with and/or undergo friction in a device for piloting of this kind.

An object of the invention is also to propose a device for piloting of this kind which moreover is capable of great precision and great sensitivity and is compatible with use on board all kinds of craft, including aircrafts such as aeroplanes or helicopters.

The invention relates thus to a device for piloting a craft, comprising:

a piloting member connected to at least one member for driving the craft, an electromechanical support box on which said piloting member is mounted and guided in rotation by means of at least one pivot connection about an axis, the electromechanical support box comprising, for each pivot connection of the piloting member in relation to said electromechanical support box, at least one actuating motor of the piloting member in rotation about said pivot connection, each actuating motor being constituted of an electromagnetic actuator comprising:

- a movable armature equipped with at least one permanent magnet and associated with the piloting member such that said movable armature and piloting member are interdependent in position in relation to the movements of the piloting member about said pivot connection,
- an electromagnetic circuit including:
  - an armature, called the fixed armature, arranged to allow the movable armature to move in an air gap zone opposite at least one surface portion of the fixed armature, a magnetic moment of the movable armature sweeping said at least one surface portion of the fixed armature, and
  - at least one coil winding which is dependent in position on the fixed armature, said at least one coil winding being arranged so that it could be connected to a source of direct electrical current, said electromagnetic circuit being arranged to generate electromagnetic torque on said movable armature in relation to the axis of said pivot connection, wherein for each pivot connection of the piloting member relative to said electromechanical support box:

- at least one permanent magnet of the movable armature of each electromagnetic actuator has a magnetic moment parallel to the axis of said pivot connection,
- said at least one surface portion of the fixed armature opposite which the movable armature moves in the air gap zone extends radially in relation to the axis of said pivot connection,
- said electromagnetic circuit is arranged to generate an electromagnetic return torque of said movable armature in relation to the axis of said pivot connection into a stable neutral position, at least in the absence of electrical supply to each winding.

Advantageously, the electromagnetic circuit is also configured to generate an electromagnetic torque on said movable armature in relation to the axis of said pivot connection, at least when each winding is supplied with electrical current and/or when each winding is short-circuited and/or connected to a load resistor in a manner capable of forming the location of eddy currents forming a damping element.

An electromagnetic actuator of this kind which is provided for each pivot connection of the piloting member has, surprisingly and despite its simplicity, a great deal of advantages over prior art devices. In particular, it is distinguished from an electric motor such as a torque motor or a synchronous motor having a rotor that turns about its axis in a stator.

It is a simple matter to bring about electrical control of an electromagnetic actuator of this kind in the form of a simple single-phase direct current without the need for any automatically switching sensor, to obtain all the desired functions for motorisation of the piloting member, depending on the application. Furthermore, there is no need to provide a mechanical transmission with gears or other parts in relative movement between the movable armature and the piloting member.

Advantageously and according to the invention, the electromagnetic circuit is configured to generate a first torque value for return to the stable neutral position in the absence of power supply to the windings (resulting from the permanent magnetisation of the movable armature) and a second torque value (greater than the first value) for return to the stable neutral position in the presence of electrical supply to the windings. An electromagnetic actuator of this kind serves by design as a "magnetic spring", even in the event of a breakdown in the electrical supply to the windings. It can easily be controlled to serve as a damping element, a generator of force sensations, an aid for the movements, etc.

Advantageously and according to the invention, the electromagnetic circuit is configured to generate in each air gap zone a magnetic inductance which is substantially parallel to the axis of said pivot connection, when each winding is supplied with electrical current.

Consequently, when each winding is supplied with electrical current, the electromagnetic actuator exerts on the movable armature a torque generated by the Laplace forces that are developed within the actuator according to the so-called principle of maximum flow, the magnetic field generated by a magnet of the movable armature tending to align with the magnetic field generated in each air gap zone.

Such an electromagnetic actuator of a device according to the invention may be the subject to various embodiments.

In particular, advantageously and according to the invention, said movable armature has a general shape of a thin plate extending, like the air gap zone, substantially at a right angle to the axis of said pivot connection.

Consequently, each air gap zone of the fixed armature may be made as small as possible, which is beneficial for improved effectiveness. Preferably, each movable armature in the form of a thin plate has a shape which is generally curved around the axis of the pivot connection, in particular being as close as possible to a ring-shaped portion.

The movable armature of an electromagnetic actuator of a device according to the invention may have a single permanent magnet, preferably in the shape of a plate, whereof the magnetic moment is parallel to the axis of the pivot connection, that is to say parallel to its thickness.

Advantageously and according to the invention, said movable armature comprises, for each pivot connection, at least two—in particular and preferably only two—permanent magnets which are juxtaposed transversely in relation to the axis of said pivot connection, such that they pass successively opposite at least one air gap zone, with the magnetic moments of two successive juxtaposed magnets being oriented in opposite directions.

Furthermore, the arrangement of each coil winding in relation to the box and in relation to siid fixed armature may be subject to different variants. Preferably, advantageously and according to the invention each coil winding is mounted in relation to the box such that it has a winding axis parallel to the axis of said pivot connection. Each winding is of a simple shape and does not need complex slots to be made in the fixed armature, but provides optimum electromagnetic effectiveness. In particular, advantageously and according to the invention, said at least one coil winding is arranged so as to exhibit, opposite the movable armature, portions called effective portions, extending at least substantially radially in relation to the axis of said pivot connection. Consequently, the magnetic flux generated by the permanent magnets and intersected by the effective portions remains at least substantially constant. Consequently, in this preferred embodiment said at least one coil winding is of an overall triangular shape.

Similarly, advantageously and according to the invention, said movable armature comprises two permanent magnets juxtaposed at an angle to one another and successively about the axis. Consequently, for each pivot connection, the device according to the invention comprises a single pair of poles and, from the electromagnetic point of view, a single winding (formed by a winding on a single side of the movable armature or by two windings, one each side of the movable armature). Moreover, advantageously and according to the invention, each permanent magnet has a general shape of a portion (an angular section) of a ring about the axis of said pivot connection and extends over an angular sector suitable for the desired travel of the movable armature, in particular between 20° and 90°, for example in the order of 70°. In addition the two permanent magnets are juxtaposed at an angle to one another and successively about the axis of said pivot connection such that the two angularly juxtaposed permanent magnets extend over a total angular sector which is suitable for the desired travel of the movable armature, in particular between 40° and 180°, for example in the order of 140°.

Moreover, advantageously and according to the invention, the electromagnetic actuator comprises for each pivot connection two coil windings aligned on the same axis parallel to the axis of said pivot connection, that is to say one single coil winding on each side of said movable armature. Moreover, said fixed armature has an air gap zone which is axially situated between the two coil windings. This arrangement in particular makes it easier to obtain, in each air gap zone, magnetic field lines which are parallel to one another and to the axis of the pivot connection and at a right angle to the movable armature, that is to say parallel to the magnetic moments of the magnets thereof.

In addition, advantageously and according to the invention the fixed armature of said electromagnetic circuit comprises, for each winding, a polar part which surrounds said coil winding, with the fixed armature arranged to generate closed-loop magnetic inductance. A fixed armature of this kind allows the magnetic inductance field lines to be channeled while minimising losses.

Moreover, advantageously and according to the invention, said electromagnetic circuit comprises limit stops for the movable armature in one direction or the other from said stable neutral position, the maximum amplitude of angular deflection of the movable armature about the axis of said pivot connection being less than 180° —especially in the order of 40°, in particular more or less 20° about said stable neutral position.

These limit stops are useful for functioning of the piloting member but also for ensuring proper functioning of the electromagnetic actuator while ensuring that the magnetised movable armature remains under the magnetic effect of the electromagnetic circuit.

In addition, each electromagnetic actuator may advantageously be integrated within the electromagnetic box. Advantageously and according to the invention, the piloting member comprises a maneuvering handle extending radially to one side of each pivot connection beyond the electromagnetic support box, and wherein said movable armature extends into the electromagnetic support box opposite the maneuvering handle in relation to the pivot connection. Thus, none of the electromagnetic actuators disturb the operations of transmission of the piloting member, and it is easier to assemble the unit. Moreover, each movable armature may serve as a counterweight, which is favourable for the ergonomics of functioning and handling the piloting member.

In a preferred embodiment which is particularly advantageous, a device according to the invention is also characterised in that said piloting member is mounted and guided in rotation by means of two pivot connections which pivot axes are at a right angle in relation to the electromagnetic support box, and wherein it includes at least a first electromagnetic actuator associated with the first pivot connection and at least a second electromagnetic actuator associated with the second pivot connection.

In an advantageous application, the piloting member of a device for piloting according to the invention is a sidestick for piloting an aircraft, mounted on the electromagnetic box by means of a first piloting pivot connection in the direction of pitch and a second piloting pivot connection in the direction of roll.

The invention is advantageously applied in particular to an aircraft such as an aeroplane or a helicopter. The invention therefore also extends to an aircraft comprising at least one piloting member connected to at least one rudder of the aircraft to control the position and movements thereof, characterised in that it comprises at least one device for piloting according to the invention for controlling at least one rudder of this aircraft. However, the invention also applies to other types of craft, in particular land vehicles and ships or submarines, for example for controlling at least one hydrodynamic rudder of these latter.

The invention also relates to a device for piloting a craft and an aircraft which are characterised in combination by all or some of the characterised mentioned above or below.

BRIEF DESCRIPTION OF THE DRAWINGS

Other objects, characteristics and advantages of the invention will become apparent from reading the description below of one of its preferred embodiments, which is given purely by way of non-restrictive example and which refers to the attached figures, in which:

FIG. 5 is a sectional diagram, along the same plane as in FIG. 4, of the electromagnetic actuating circuit along the pitch axis, showing the magnetic field lines in the absence of a current passing through the windings, with the movable armature in the neutral position, FIGS. 6a and 6b are diagrams similar to FIG. 5, showing the magnetic field lines induced solely by the electromagnetic circuit supplied with current, respectively in each direction of passage of the current in the windings, in the absence of a movable armature, FIG. 7 is a diagram similar to FIG. 5, showing the magnetic field lines in the presence of a current passing through the windings, with the movable armature in the neutral position, FIG. 8 is a diagram similar to FIG. 7, with the current passing through the windings in the reverse direction, FIG. 9 is a diagram similar to FIG. 5, with the movable armature in a position displaced from the neutral position, FIG. 10 and FIG. 11 are diagrams similar to FIGS. 7 and 8 respectively, with the movable armature in a position displaced from the neutral position.

DETAILED DESCRIPTION OF THE PREFERRED EMBODIMENTS

Figure 1:
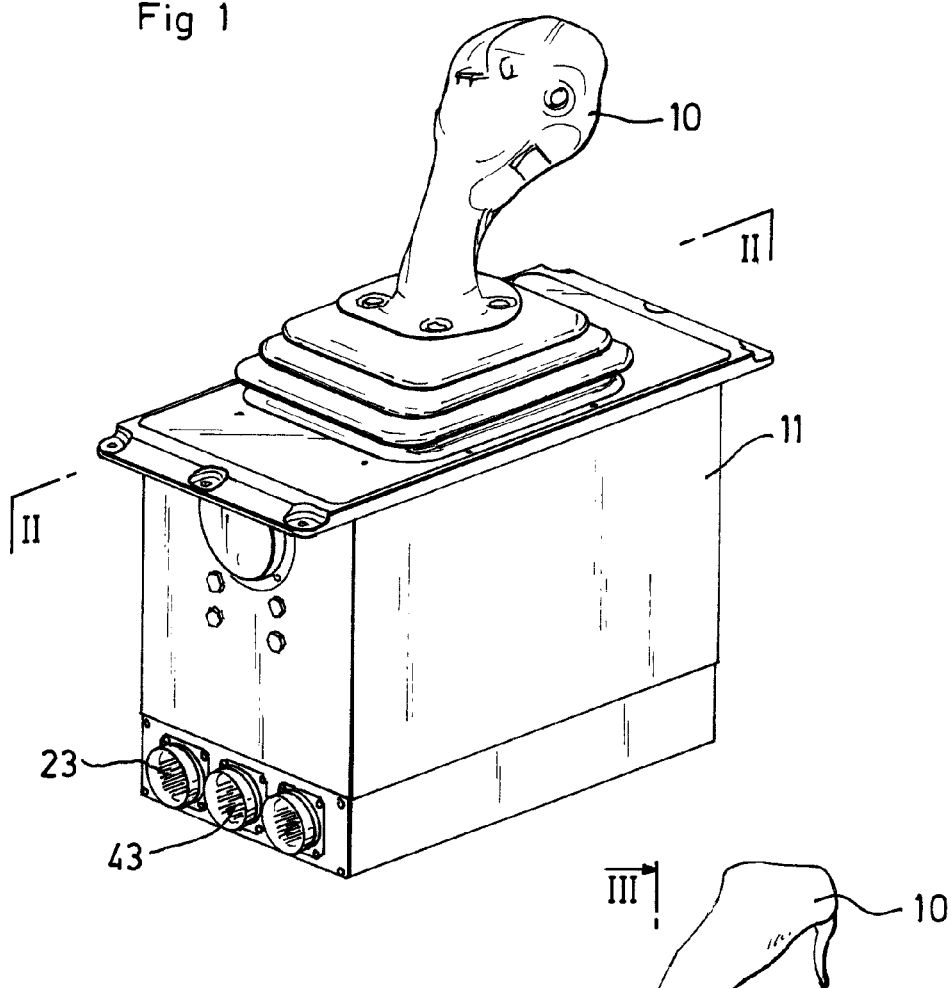
FIG. 1 is a diagrammatic perspective view of a device for piloting according to the invention.

The piloting member shown in FIG. 1 according to the invention comprises a piloting member which in the example is a sidestick 10 for piloting an aircraft, articulated to an electromechanical box 11 by means of two pivot connections having axes which are at a right angle and secant, namely a pitch axis 12 and a roll axis 13. A piloting member of this kind is connected by way of a transmission system (which may be formed in its entirety or in part by members for transmission and/or actuation which are mechanical and/or hydraulic and/or pneumatic and/or electrical or of another type) to at least one driving member (not shown) of the craft, for example at least one rudder of the aircraft.

To this end, the sidestick 10 is mounted on a cradle 14, which has two longitudinal side walls 16, by way of two coaxial roller bearings 15 which are integrally formed with upper parts of the side walls 16 such that they form a pivot connection in the pitch direction along the axis 12 of roll, which is at a right angle to the side walls 16 of the cradle 14.

The cradle 14 is hollow and serves as a casing enclosing an electromagnetic actuator 17 which allows the sidestick 10 to be actuated by way of the pivot connection in the pitch direction, that is to say to exert an electromagnetic driving torque on the sidestick 10 about the axis 12, depending on predetermined conditions.

This pitch electromagnetic actuator 17 comprises an armature, called the fixed armature 18, mounted on the box 11 by way of the cradle 14, and including two polar parts 18 which are each fixed inside a respective one of the side walls 16, defining between them an air gap 19 in which a movable armature 20 integrally formed with the sidestick 10 moves as a function of the pivoting movements of the sidestick 10 about the pitch axis 12. The polar parts 18 are made of pure iron or of an iron alloy (Fe—Ni, Fe—Co, Fe—Si, etc.) or another soft magnetic alloy. They are solid or laminated (layered) in order to limit losses due to eddy currents. The air gap 19 is defined by surface portions of the two polar parts 18 parallel to one another and opposite one another, these surface portions extending overall transversely in relation to the pitch axis 12, that is to say in a plane at a right angle to this pitch axis 12.

The movable armature 20 is generally in the shape of a plate and a ring portion around the axis 12, overall extending—like the air gap 19—in a radial plane at a right angle to the pitch axis 12 and having two permanent magnets 20a, 20b. Each permanent magnet 20a, 20b is overall in the general shape of a ring portion around the axis 12 and extends over an angular sector that is suitable for the desired travel of the movable armature, in particular between 20° and 90°, for example in the order of 70°, and the two permanent magnets 20a, 20b are juxtaposed at an angle to one another and successively about the axis 12, such that they extend over a total angular sector which is suitable for the desired travel of the movable armature, in particular between 40° and 180°, for example in the order of 140°. The angular extent covered by the magnets 20a, 20b of the movable armature 20 depends on the desired amplitude of the angular deflection for the sidestick 10 about the pitch axis 12. Since this amplitude of angular deflection is less than 180°, the same applies to the total angular extent of the movable armature 20 about the pitch axis 12.

Each permanent magnet 20a, 20b has a magnetic moment which is oriented substantially parallel to the pitch axis 12, but in the preferred embodiment illustrated, the two magnetic moments of the two permanent magnets 20a, 20b are in opposite directions to one another. When the piloting member 10 is moved in rotation about the axis 12, the magnetic moment of the permanent magnets 20a, 20b sweeps each surface portion of the fixed armature 18 opposite, delimiting the air gap 19. The magnetic moment of the permanent magnets 20a, 20b is overall at a right angle to each of these surface portions.

Preferably, the two magnets 20a, 20b are identical, in particular extending at an angle, by the same angular sector value about the axis 12, symmetrically on either side of a transverse plane containing the pitch axis 12 and the principal axis 21 of the sidestick 10. However, there is no reason for successive magnets 20a, 20b not to have different angular dimensions, in accordance with the characteristics of the torque to be exerted on the sidestick 10. Advantageously, the movable armature 20 is formed by two parts which are fixed to one another and superposed along the pitch axis 12, each guided by a roller bearing 15 and forming in particular two plates that are superposed by way of their principal face in which the permanent magnets 20a, 20b are integrated.

Each polar part 18 of the fixed armature defines a housing for receiving a coil winding 22 of an insulated electrical conductor, forming an electromagnetic winding capable of being connected to a source of direct electrical current from a control and electrical supply unit by way of connectors 23 for supplying the box 11. In a variant which is not illustrated, the windings 22 are short-circuited or open into a (or a plurality of) load resistor(s) such that they generate a passive damping (that is, without an external supply) by means of eddy currents. The housings for receiving the windings 22 are partly closed by plates 24 of the polar parts 18, which keep the windings 22 in place and form between them the air gap 19.

The windings 22 are coaxial and wound around a winding axis 26 which is parallel to the pitch axis 12, and is overall centred in relation to the cradle 14 and is opposite a notional centre line of the magnets 20a, 20b. This axis 26 corresponds to a central core 27 of each polar part 18. The windings 22 are opposite one another and parallel to one another (the coils of a winding 22 being overall parallel to the coils of the other winding 22) and are also overall parallel to the air gap 19 and the surface portions of the fixed armature 18 delimiting them.

Figure 2:
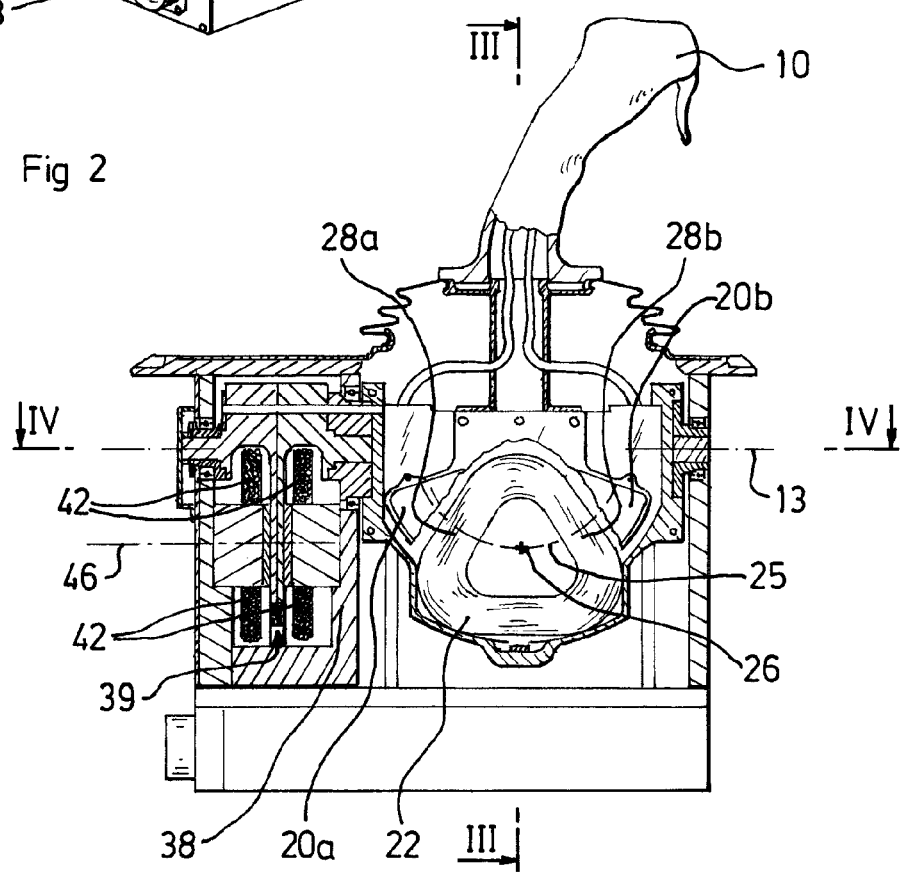
FIG. 2 is a diagrammatic sectional view along a longitudinal vertical centre plane II-II of the device in FIG. 1, partly cut away and illustrating the shape of a winding.
Figure 3:
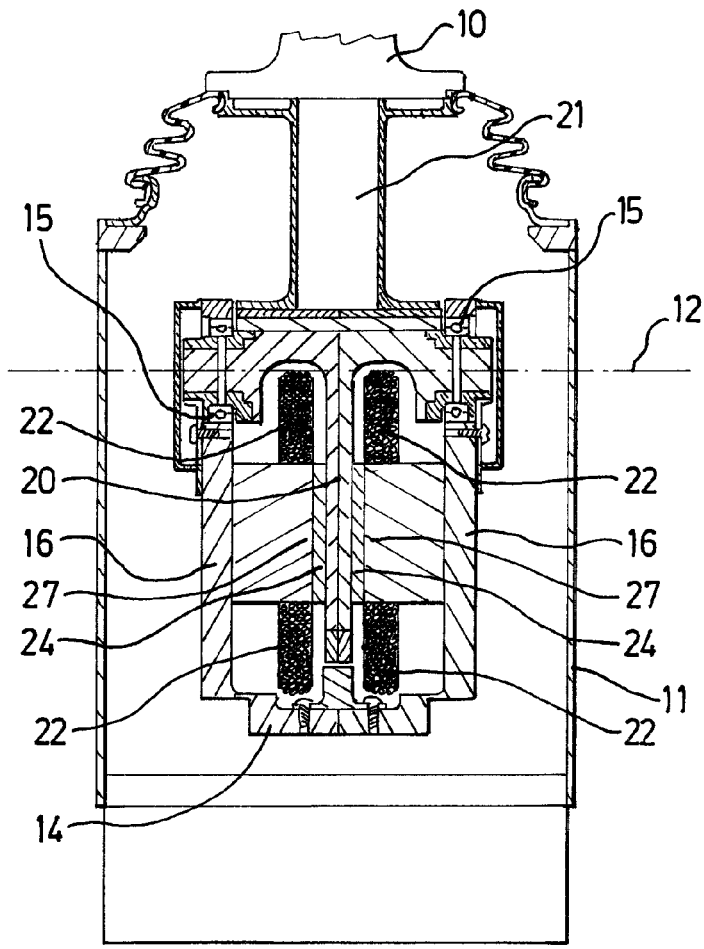
FIG. 3 is a diagrammatic sectional view along the line III-III in FIG. 2.
Figure 4:
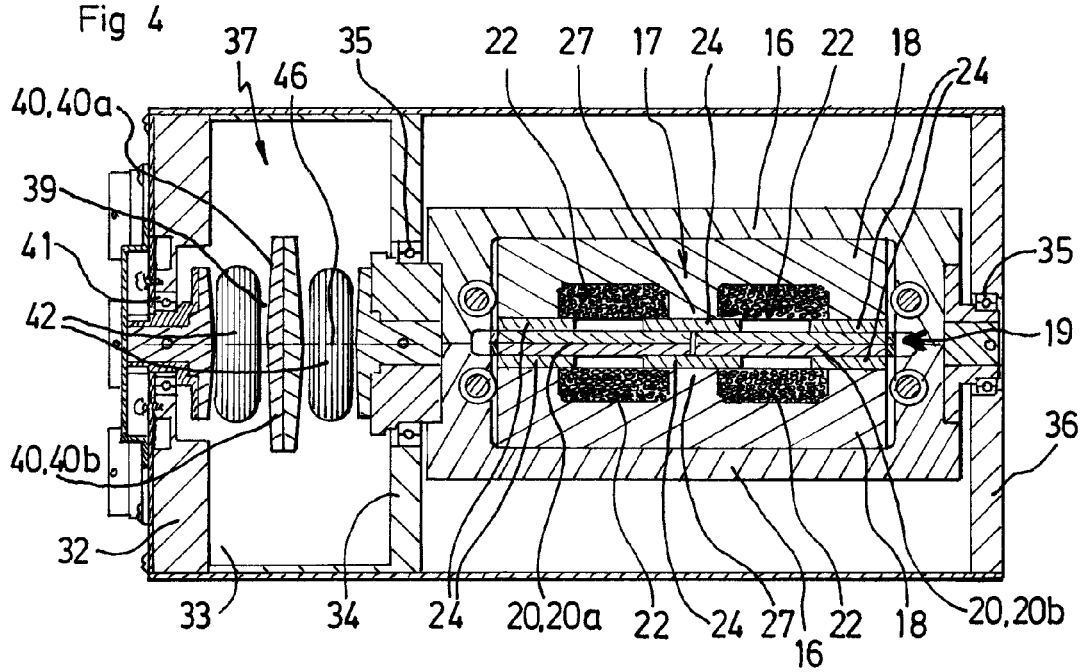
FIG. 4 is a diagrammatic sectional view along the line IV-IV in FIG. 2.

The winding coils 22 may take different forms (circular, more or less polygonal, etc.). Preferably, the winding coils 22 are suitable for including opposite the movable armature 20 portions, called effective portions 28a, 28b (in the cutaway portion of FIG. 2), which extend at least substantially radially in relation to the axis 12. Consequently, the magnetic flux generated by the permanent magnets 20a, 20b and intersected by the effective portions 28a, 28b remains at least substantially constant. Consequently, in this preferred embodiment the winding coils 22 are of an overall triangular shape, as shown in FIG. 2.

The side walls 16 of the cradle are prolonged towards one another at their longitudinal ends so that they may be fixed to one another, enclosing the electromagnetic actuator 17. Moreover, the side walls 16 are suitable for serving as stops limiting the angular displacement of the movable armature 20 in one direction and the other direction around the pitch axis 12.

The cradle 14 which is formed in this way is itself mounted to rotate on the box 11 along the roll axis 13, which is perpendicular to the pitch axis 12, by means of two coaxial roller bearings 35 whereof one is integrally formed with the upper part of a transverse vertical end wall 36 of the box 11 and the other is integrally formed with a transverse vertical intermediate wall 34 of the box 11.

The box 11 also forms a housing 33 between the intermediate wall 34 and a second transverse vertical end wall 32 opposite the end wall 36 carrying one of the roller bearings 35. This housing 33 encloses a roll electromagnetic actuator 37 allowing the sidestick 10 to be actuated by way of the roll pivot connection, that is to say to exert an electromagnetic driving torque on the sidestick 10 about the axis 13, depending on predetermined conditions.

Said roll electromagnetic actuator 37 comprises a fixed armature including two polar parts 38 which are each fixed inside a respective one of the transverse walls 32, 34, defining between them an air gap 39 in which a movable armature 40 comprising two permanent magnets 40a, 40b that succeed one another in the angular direction moves, this movable armature 40 being integrally formed with the cradle 14 (and thus indirectly with the sidestick 10 for its roll movements) and moving as a function of the pivoting movements of the sidestick 10 about the roll axis 13. The polar parts 38 are made of pure iron or of an iron alloy (Fe—Ni, Fe—Co, Fe—Si, etc.) or another soft magnetic alloy. They are solid or laminated (layered) in order to limit losses due to eddy currents.

The roll electromagnetic actuator 37 is similar to the pitch electromagnetic actuator 17 and in particular also has windings of coaxial coils 42 of an insulated electrical conductor, with a winding 42 being integrally formed with each polar part 38 of the fixed armature. The windings 42 are centred on a winding axis 46 which is parallel to the roll axis 13, this axis 46 of the windings 42 being opposite a centre line of two permanent magnets 40a, 40b of the movable armature 40. The movable armature 40 is in the form of a plate and a ring portion around the axis 13 and extends radially in relation to the roll axis of 13 and moves in the air gap 39 as a function of the pivotal movements of the sidestick 10 about the roll axis 13. The windings 42 are opposite one another and parallel to one another (the coils of a winding 42 being overall parallel to the coils of the other winding 42) and are also overall parallel to the air gap 39.

The winding coils 42 may also take different forms (circular, more or less polygonal, etc.). Preferably, the winding coils 42 are suitable for including opposite the movable armature 40 portions, called effective portions, which extend at least substantially radially in relation to the axis 13. Consequently, the magnetic flux generated by the permanent magnets 40a, 40b and intersected by the effective portions remains at least substantially constant. Consequently, in this preferred embodiment the winding coils 42 are of an overall triangular shape.

The magnetised movable armature 40 is mounted to rotate and is fixed in rotation with the cradle 14 about the roll axis 13 by the roller bearing 35 carried by the transverse intermediate wall 34 and by a second roller bearing 41 which is integrally formed with the upper part of the transverse end wall 32. Here too, the amplitude of angular deflection of the movable armature 40 about the axis 13 is less than 180°. The magnetic moment of the permanent magnets 40a, 40b is parallel to the roll axis 13 and, in the course of the angular deflections of the sidestick 10 about the roll axis 13, sweeps surface portions of the fixed armature 38 delimiting the air gap 39, with these surface portions, the air gap 39 and the movable armature 40 extending radially in relation to the roll axis 13.

Each winding 42 is also capable of being connected to a source of direct electrical current from a control and electrical supply unit by way of connectors 43 for supplying the box 11. In a variant which is not illustrated, the windings 42 are short-circuited or open into a (or a plurality of) load resistor(s) such that they generate a passive damping (that is, without an external supply) by means of eddy currents. The windings 42 for the roll electromagnetic actuator 37 are supplied and controlled independently of the windings 22 of the pitch electromagnetic actuator 17.

Figure 12:
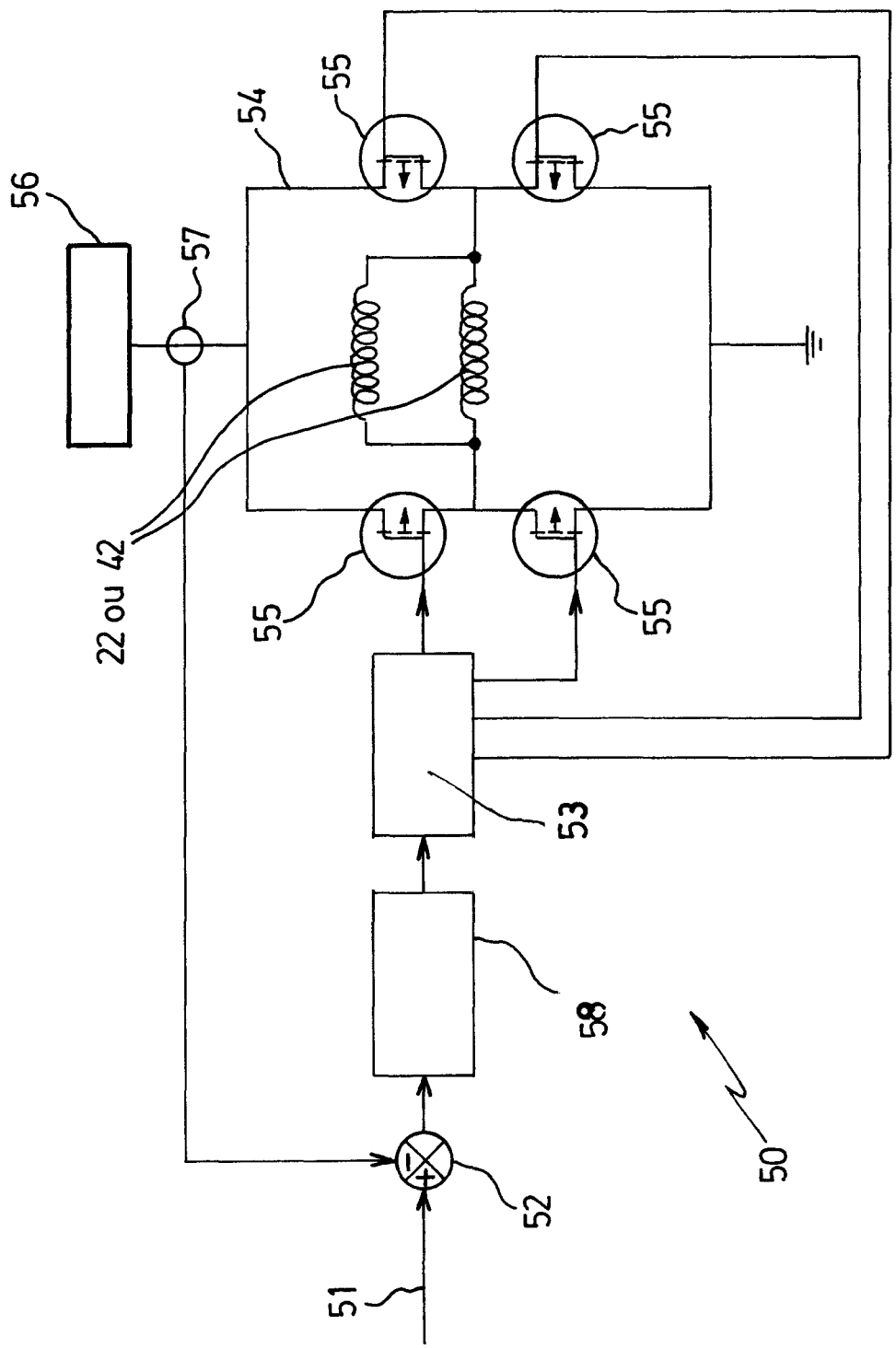
FIG. 12 is an electronics diagram showing a variant embodiment of a unit for supplying electricity to an electromagnetic actuator of a device according to the invention.

FIG. 12 shows an embodiment of a unit 50 for supplying windings 22 or 42 of an electromagnetic actuator 17 or 37. This unit 50 receives an input 51 on the intensity of the supplied current which is compared by a comparator 52 with a measured value of the intensity drained by the windings. The result of the comparison is sent to a current regulator 58 (for example of the PI, PID, RST or other type), and the output from this regulator 58 is sent to a pulse width modulation generator 53, which controls a switching circuit 54 having four field effect transistors 55 which are bridge-mounted for supplying the two windings in parallel by chopping a source of direct current voltage 56 that is connected to the switching circuit 54. The intensity drained by the windings is measured by a sensor 57 placed between the voltage source 56 and the switching circuit 54.

In a variant which is not shown, the supply unit 50 may be set up to incorporate redundancy, with each winding of a pair of windings 22 or 42 being supplied separately by a supply arm which is particular to it and receives an input of the intensity of the current supplied to this winding. Each supply arm in this case comprises a comparator, a current regulator, a pulse width modulation generator, a switching circuit having bridge-mounted field effect transistors, a source of direct current voltage that supplies this switching circuit, and a sensor for measuring the intensity of the current drained between the voltage source and the switching circuit, this measured value being fed to the comparator. In a variant which is not shown, the windings 22 or 42 are short-circuited or output to a (or a plurality of) resistor(s) such that such that they generate a passive damping (that is, without an external supply) by means of eddy currents.

FIG. 5 shows the lines of the magnetic field induced by the permanent magnets 20a, 20b of the movable armature 20 when the current supplied to the windings 22 is zero. As can be seen, in the air gap 19 the magnetic field is at a right angle to the thickness of the movable armature 20 and parallel to the axis 12 of rotation of the movable armature 20 and the piloting member 10. The magnetic field Ba formed by the first magnet 20a is in the opposite direction to the magnetic field Bb formed by the second magnet 20b. The fixed armature channels the field lines. When the movable armature 20 is in place, centred in the air gap 19 as shown in FIG. 5, it is kept in place by the magnetic field of the permanent magnets 20a, 20b cooperating with the fixed armature 18. This position thus corresponds to a central, stable neutral position of the movable armature 20, even in the absence of a supply current in the windings 22.

FIGS. 6a and 6b show the lines of the magnetic field induced by the two windings 22 when the latter are supplied with electrical current, in the absence of the movable armature 20. As can be seen, the magnetic field is at a maximum in the vicinity of the axis 26 of the windings 22 and at a right angle to the air gap 19. FIGS. 6a and 6b differ from one another solely in the direction of the current supplying the windings 22.

FIG. 7 is a view similar to FIG. 5, showing the lines of the total magnetic field induced by the permanent magnets 20a, 20b and the windings 22 supplied with electrical current in the direction indicated in this figure. Distribution of the magnetic field in the fixed armature 18 generates a force F1 that moves the movable armature 20 in the air gap 19, which results in a torque about the axis 12 of rotation.

FIG. 8 is a view similar to FIG. 7, showing the lines of the magnetic field when the windings 22 are supplied with electrical current in the opposite direction to that in FIG. 7, as indicated in this figure. Distribution of the magnetic field in the fixed armature 18 generates a force—F1 that moves the movable armature 20 in the air gap 19, in the opposite direction to that in FIG. 7, which again results in a torque about its axis 12 of rotation in the opposite direction to that in FIG. 7.

FIG. 9 shows the situation in which the movable armature 20 is moved to one side, with the windings 22 not supplied with electrical current. The fact that the permanent magnets 20*a*, 20*b* cooperate with the fixed armature 18 generates a force F2 that moves the movable armature 20 in the air gap 19, which results in a torque about the axis 12 of rotation that tends to return the movable armature 20 to the stable neutral position corresponding to that in FIG. 5.

FIG. 10 shows a situation similar to that in FIG. 9, supposing that the windings 22 are supplied with electrical current in the direction indicated in this figure. The field induced by the windings 22 adds a force F3 that moves the movable armature 20 in the air gap 19, in the same direction as the force F2 generated by the permanent magnets 20*a*, 20*b*.

FIG. 11 shows a situation similar to that in FIG. 10, supposing that the windings 22 are supplied with electrical current in the direction indicated in this figure, opposite to that in FIG. 10. The field induced by the windings 22 creates a force—F3 which opposes the force F2 generated by the permanent magnets 20*a*, 20*b* and results in a torque about the axis 12 of rotation that tends to move the movable armature 20 even further away from the neutral stable position if $\|F3\| > \|F2\|$.

Figure 13:
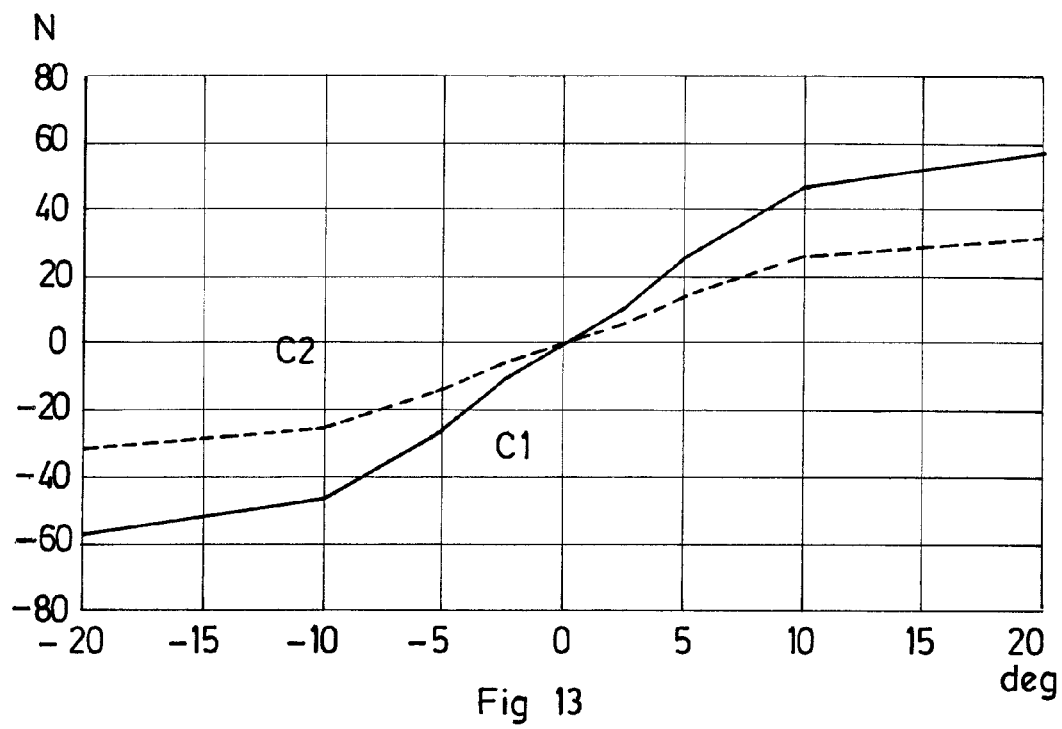
FIG. 13 is a graph showing the variations in the force exerted on the piloting member as a function of its angular position, in the absence of an electrical supply to the electromagnetic actuators.

FIG. 13 shows the results of force measurements, taking as an example a sidestick 10 according to the invention, as a function of the angular position of the sidestick 10 when the current supplying the windings 22, 42 of the two electromagnetic actuators is zero. Curve C1 shows the variations in force through the pitch axis 12, and curve C2 shows the variations in force through the roll axis 13. As can be seen, the electromagnetic actuators 17, 37, even in the absence of any current supplied to the windings, create a return force which is substantially proportional to the amplitude of angular displacement in the manner of an elastic spring.

Figure 14:
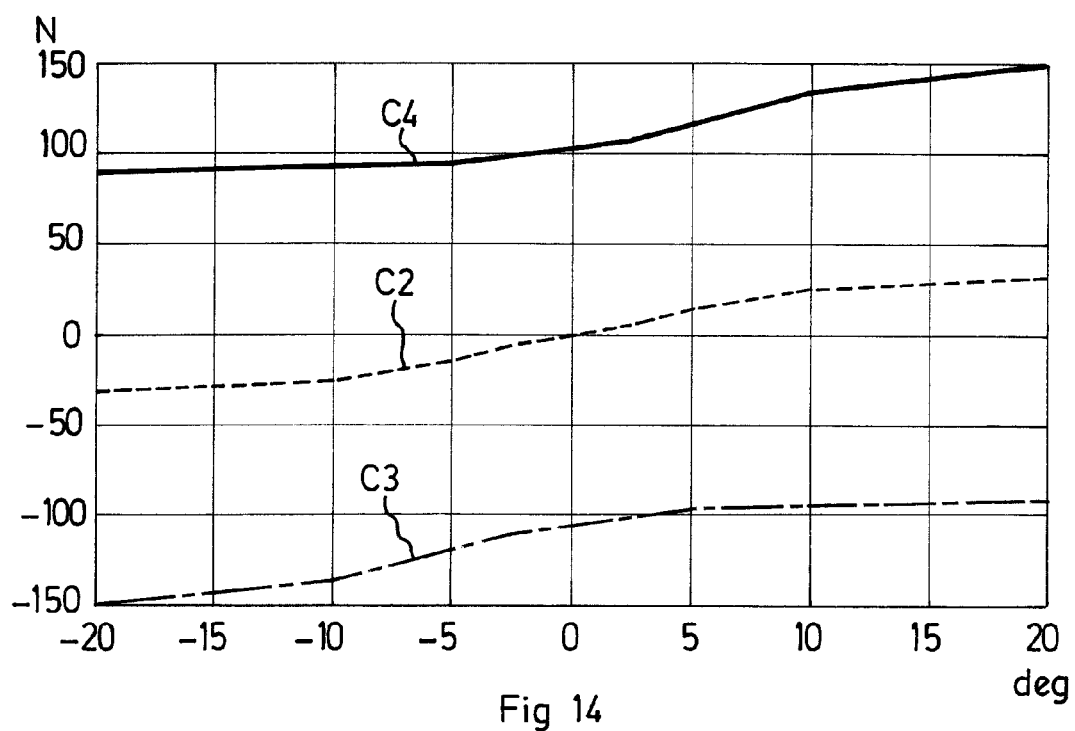
FIG. 14 is a graph showing the variations in the force exerted by the roll electromagnetic actuator on the piloting member as a function of the angular position of the piloting member, in the presence of an electrical supply to the roll electromagnetic actuator.

FIG. 14 shows the results of force measurements on the roll axis 13, on the one hand in the absence of any current supplied to the electromagnetic actuator 37 (curve C2), and on the other with a supply current of maximum intensity in a first direction corresponding to FIG. 10, in which the torques induced by the permanent magnets and the windings are added together (curve C3), and finally with a supply current of maximum intensity in the opposite direction, corresponding to FIG. 11, in which the torques induced by the permanent magnets and the windings are in opposition (curve C4).

As can be seen, the device for piloting according to the invention has no return spring or damping element and has a much reduced number of parts—in particular the number of parts in contact and/or undergoing friction—and has characteristics for actuating the piloting member which are similar to those obtainable hitherto.

A piloting device of this kind may be used in numerous applications and may for example allow the generation of sensations of return to the neutral position and/or variable forces on the sidestick, of the application of automatic pilot controls, and so on. The piloting device according to the invention is moreover equipped with various other accessory members allowing it to function and to be integrated on board an aircraft: position sensors, speed sensors, acceleration sensors, force sensors, units for monitoring function, and so on.

It is also possible for the invention to be subject to numerous variant embodiments in relation to the single embodiment shown in the figures. In particular, it should be noted that each electromagnetic actuator may be equipped with a single winding such as 22 or 42. Each movable armature 20, 40 may be equipped with a different number of permanent magnets. Moreover, the fixed armatures and/or the cradle 14 and/or the walls of the box 11 are advantageously arranged such that they serve as a stop limiting the angular deflection of the piloting member 10 about each axis of rotation in one direction or the other, in order in particular to ensure that both the movable armature and the fixed armature and the windings remain within the magnetic influence of one another.

The invention claimed is:
1. A device for piloting a craft, comprising:
a piloting member connected to at least one member for driving the craft,
an electromechanical support box on which said piloting member is mounted and guided in rotation by means of at least one pivot connection about an axis, the electromechanical support box comprising, for each pivot connection of the piloting member in relation to said electromechanical support box, at least one actuating motor of the piloting member in rotation about said pivot connection, each actuating motor being constituted of an electromagnetic actuator comprising:
a movable armature equipped with at least one permanent magnet and associated with the piloting member such that said movable armature and piloting member are interdependent in position in relation to the movements of the piloting member about said at least one pivot connection,
an electromagnetic circuit including: (i) an armature, called the fixed armature, arranged to allow the movable armature to move in an air gap zone opposite at least one surface portion of the fixed armature, a magnetic moment of the movable armature sweeping said at least one surface portion of the fixed armature when said piloting member is rotated, and (ii) at least one coil winding which is dependent in position on the fixed armature, said at least one coil winding being arranged so that the at least one coil winding could be connected to a source of direct electrical current, said electromagnetic circuit being arranged to generate electromagnetic torque on said movable armature in relation to the axis of said pivot connection,
wherein for each pivot connection of the piloting member relative to said electromechanical support box:
at least one permanent magnet of the movable armature of each electromagnetic actuator which magnetic moment sweeps at least one surface portion, called at least one swept surface portion, of the fixed armature when said piloting member is rotated about said pivot connection, has a magnetic moment that is parallel to the axis of said pivot connection,
said at least one swept surface portion extends radially in relation to the axis of said pivot connection,
said electromagnetic circuit is arranged to generate an electromagnetic return torque of said movable armature in relation to the axis of said pivot connection into a stable neutral position, at least in the absence of electrical supply to each winding.
2. The device as claimed in claim 1, wherein the electromagnetic circuit is configured to generate in each air gap zone an induced magnetic field which is substantially parallel to the axis of said pivot connection, when each winding is supplied with electrical current.

3. The device as claimed in claim 2, wherein said movable armature has a general shape of a thin plate extending, like the air gap zone, substantially at a right angle to the axis of said pivot connection.

4. The device as claimed in claim 1, wherein said movable armature comprises at least two permanent magnets which are juxtaposed transversely in relation to the axis of said pivot connection, such that they pass successively opposite said air gap zone, with the magnetic moments of two successive juxtaposed magnets being oriented in opposite directions.

5. The device as claimed in claim 1, wherein each coil winding is mounted in relation to said box such that each coil winding has a winding axis parallel to the axis of said pivot connection.

6. The device as claimed in claim 1, further comprising for each pivot connection two coil windings aligned on the same axis parallel to the axis of said pivot connection, one on each side of said movable armature, and wherein said air gap zone of said fixed armature is axially situated between the two windings.

7. The device as claimed in claim 1, wherein the fixed armature of said electromagnetic circuit comprises, for each coil winding, a polar part which surrounds said coil winding, with the fixed armature arranged to generate closed-loop magnetic inductance.

8. The device as claimed in claim 1, wherein said electromagnetic circuit comprises limit stops for the movable armature in one direction or the other from said stable neutral position, the maximum amplitude of angular deflection of the movable armature about the axis of said pivot connection being less than 180°.

9. The device as claimed in claim 8, wherein the maximum amplitude of angular deflection of the movable armature about the axis of said pivot connection is in the order of 40°.

10. A device for piloting a craft, comprising:
a piloting member connected to at least one member for driving the craft,
an electromechanical support box on which said piloting member is mounted and guided in rotation by means of at least one pivot connection about an axis, the electromechanical support box comprising, for each pivot connection of the piloting member in relation to said electromechanical support box, at least one actuating motor of the piloting member in rotation about said pivot connection, each actuating motor being constituted of an electromagnetic actuator comprising:
a movable armature equipped with at least one permanent magnet and associated with the piloting member such that said movable armature and piloting member are interdependent in position in relation to the movements of the piloting member about said at least one pivot connection,
an electromagnetic circuit including: (i) an armature, called the fixed armature, arranged to allow the movable armature to move in an air gap zone opposite at least one surface portion of the fixed armature, a magnetic moment of the movable armature sweeping said at least one surface portion of the fixed armature when said piloting member is rotated, and (ii) at least one coil winding which is dependent in position on the fixed armature, said at least one coil winding being arranged so that the at least one coil winding could be connected to a source of direct electrical current, said electromagnetic circuit being arranged to generate electromagnetic torque on said movable armature in relation to the axis of said pivot connection,
wherein for each pivot connection of the piloting member relative to said electromechanical support box:
at least one permanent magnet of the movable armature of each electromagnetic actuator which magnetic moment sweeps at least one surface portion, called at least one swept surface portion, of the fixed armature when said piloting member is rotated about said pivot connection, has a magnetic moment that is parallel to the axis of said pivot connection,
said at least one swept surface portion extends radially in relation to the axis of said pivot connection,
said electromagnetic circuit is arranged to generate an electromagnetic return torque of said movable armature in relation to the axis of said pivot connection into a stable neutral position, at least in the absence of electrical supply to each winding,
wherein, the piloting member comprises a manoeuvring handle extending radially to one side of each pivot connection beyond the electromagnetic support box, and
wherein said movable armature extends into the electromagnetic support box entirely opposite the manoeuvring handle in relation to the pivot connection.

11. The device as claimed in claim 1, wherein said piloting member is mounted and guided in rotation by means of two pivot connections which pivot axes are at a right angle in relation to the electromagnetic support box, and wherein includes at least a first electromagnetic actuator associated with the first pivot connection and at least a second electromagnetic actuator associated with the second pivot connection.

12. The device as claimed in claim 1, wherein the piloting member is a sidestick for piloting an aircraft.

13. The device as claimed in claim 1, wherein said at least one coil winding is arranged so as to exhibit, opposite the movable armature, portions called effective portions, extending at least substantially radially in relation to the axis of said pivot connection.

14. The device as claimed in claim 1, wherein said at least one coil winding is of an overall triangular shape.

15. The device as claimed in claim 1, wherein each permanent magnet has a general shape of a ring portion around the axis of said pivot connection.

16. The device as claimed in claim 15, wherein said movable armature comprises two permanent magnets which are juxtaposed at an angle to one another and successively about the axis, wherein each permanent magnet extends over an angular sector between 20° and 90°, and wherein the two angularly juxtaposed permanent magnets extend over a total angular sector between 40° and 180°.

17. An aircraft comprising at least one piloting member connected to at least one rudder of the aircraft to control position and movements thereof, wherein, for controlling the at least one rudder of the aircraft, the aircraft comprises at least one of the device according to claim 1:
said electromagnetic circuit is arranged to generate an electromagnetic return torque of said movable armature in relation to the axis of said pivot connection into a stable neutral position, at least in the absence of electrical supply to each winding.

* * * * *